United States Patent
Gonczi et al.

(10) Patent No.: US 10,387,066 B1
(45) Date of Patent: Aug. 20, 2019

(54) PROVIDING DATA DEDUPLICATION IN A DATA STORAGE SYSTEM WITH PARALLELIZED COMPUTATION OF CRYPTO-DIGESTS FOR BLOCKS OF HOST I/O DATA

(71) Applicant: EMC IP Holding Company LLC, Hopkinton, MA (US)

(72) Inventors: Istvan Gonczi, Berkley, MA (US); Ivan Bassov, Brookline, MA (US); Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/956,236

(22) Filed: Apr. 18, 2018

(51) Int. Cl.
| | |
|---|---|
| *G06F 3/06* | (2006.01) |
| *H04L 9/06* | (2006.01) |
| *G06F 12/0891* | (2016.01) |
| *G06F 15/80* | (2006.01) |

(52) U.S. Cl.
CPC ........ *G06F 3/0641* (2013.01); *G06F 12/0891* (2013.01); *G06F 15/8069* (2013.01); *H04L 9/0643* (2013.01)

(58) Field of Classification Search
None
See application file for complete search history.

(56) References Cited

PUBLICATIONS

Le, Thai, et al., "Intel ISA-L: Semi-Dynamic Compression Algorithms," Intel Software, published Dec. 29, 2016, accessed Apr. 30, 2018; //https://software.intel.com/en-us/articles/intel-isa-l-semi-dynamic-compression-algorithms//, 14 pages.
Lomont, Chris, "Introduction to Intel Advanced Vector Extensions," Intel Software, published on Jun. 21, 2011, accessed on Apr. 30, 2018, //https://software.intel.com/en-us/articles/introduction-to-intel-advanced-vector-extensions// 21 pages.
Manadhata, Pratyusa, et al., "Vector Processors," (pratyus, vyass)@cs.cmu.edu, Oct. 14, 2003, 6 pages.
"Intel ISA-L: Cryptographic Hashes for Cloud Storage," Intel Software, Intel Corporation, Dec. 29, 2016, 10 pages.
"Intel Intelligent Storage Acceleration Library Crypto (Intel ISA-L Crypto) Open Source Version," API Reference Manual-Version 2.19.0, Jul. 27, 2017, 154 pages.

*Primary Examiner* — Kevin Verbrugge
(74) *Attorney, Agent, or Firm* — BainwoodHuang (57) ABSTRACT

In response to a cache flush event indicating that host data accumulated in a cache of a storage processor of a data storage system is to be flushed to a lower deck file system, an aggregation set of blocks is formed within the cache, and a digest calculation group is selected from within the aggregation set. Hardware vector processing logic is caused to simultaneously calculate crypto-digests from the blocks in the digest calculation group. If one of the resulting crypto-digests matches a previously generated crypto-digest, deduplication is performed that i) causes the lower deck file system to indicate the block of data from which the previously generated crypto-digest was generated and ii) discards the block that corresponds to the matching crypto-digest. Objects required by a digest generation component may be allocated in a just in time manner to avoid having to manage a pool of pre-allocated objects.

19 Claims, 5 Drawing Sheets

PROVIDING DATA DEDUPLICATION IN A DATA STORAGE SYSTEM WITH PARALLELIZED COMPUTATION OF CRYPTO-DIGESTS FOR BLOCKS OF HOST I/O DATA

TECHNICAL FIELD

The present disclosure relates generally to intelligent data storage systems, and more specifically to technology for providing data deduplication in a data storage system using parallelized computation of crypto-digests for blocks of host I/O data.

BACKGROUND

Data storage systems are arrangements of hardware and software that typically include multiple storage processors coupled to arrays of non-volatile data storage devices, such as magnetic disk drives, electronic flash drives, and/or optical drives. The storage processors service host I/O requests received from host machines. The received host I/O requests specify one or more data objects (e.g. logical disks or "LUNs") and indicate host data that is to be written to or read from the data objects. The storage processors include specialized hardware and software that processes the incoming host I/O requests and that performs various data storage tasks that organize and secure the host data that is received from the host machines and stored on the non-volatile data storage devices of the data storage system.

Previous data storage systems have performed deduplication on the host data that they store. Some previous data storage systems have performed block-level deduplication. In block-level deduplication, duplicate copies of blocks of data are eliminated in order to improve overall storage utilization. To accomplish in-line block-level deduplication, prior to storing a block of data in non-volatile storage of the data storage system, the block is compared to previously stored blocks in order to determine whether the block is a duplicate. In order to facilitate the comparison process, a crypto-digest may be generated for each block of data using a cryptographic hash function (e.g. SHA-1, SHA-2, etc.), and then compared with crypto-digests that were previously generated for previously stored blocks. If a crypto-digest for a new block to be stored matches a crypto-digest that was generated for a previously stored block, then a relatively small pointer to the previously stored block may be stored instead of the new block, thus reducing overall non-volatile storage requirements. When the pointer is subsequently retrieved while processing a subsequently received I/O request that is directed to the location of the new block, the pointer can simply be replaced with a copy of the previously stored block, e.g. as retrieved from the non-volatile storage of the data storage system.

SUMMARY

Unfortunately, previous data storage system technology for performing data deduplication has exhibited significant shortcomings. For example, because calculating crypto-digests is a CPU resource intensive activity, previous data storage systems have at times required the use of large amounts of shared CPU resources that are located within their storage processor to calculate all the crypto-digests for the blocks of host data that they store in their non-volatile storage. For some previous systems, under certain load conditions, a significant percentage (e.g. at times greater than ten percent) of all clock cycles of all CPU resources located in the storage processor have been required just to calculate the crypto-digests that are needed to detect duplicate blocks for purposes of performing data deduplication. Such high utilization of CPU clock cycles to generate crypto-digests within a storage processor may significantly limit the rate at which the data storage system can process received host I/O requests.

To address the above and other shortcomings of previous technologies, new technology is disclosed herein that includes simultaneous calculation of multiple crypto-digests that are used to support the data comparisons that are performed for data deduplication in a storage processor of a data storage system. In the disclosed technology, host data that is indicated by host I/O requests received by the storage processor from at least one host computer is accumulated into a cache located in the storage processor. The disclosed technology is operative to detect a cache flush event that indicates that multiple blocks of host data accumulated in the cache are to be flushed from the cache to at least one lower deck file system that is internal to the data storage system, for storage of the host data in the flushed blocks through the lower deck file system into the non-volatile storage of the data storage system. In response to detecting the cache flush event, aggregation sets are formed consisting of blocks of data within the accumulated host data that is stored in the cache (e.g. some number of the oldest blocks of host data stored in the cache).

In response to formation of the aggregation set of blocks, at least one digest calculation group of blocks is selected from within the aggregation set, and then hardware vector processing logic within the storage processor is caused to simultaneously calculate multiple crypto-digests. Each crypto-digest in the simultaneously calculated crypto-digests is calculated from a corresponding one of the blocks in the digest calculation group of blocks selected from within the aggregation set.

Each one of the calculated crypto-digests is then compared to at least one previously generated crypto-digest that was generated when a block of host data was previously flushed from the cache to the lower deck file system for storage in the non-volatile storage of the data storage system. In response to detecting that one of the crypto-digests in the set of calculated crypto-digests matches the previously generated crypto-digest, a deduplication operation is performed on the block of host data in the digest calculation group of blocks from which the matching crypto-digest was generated. The deduplication operation i) causes the lower deck file system to store an additional indication of the block of host data that was previously flushed from the cache to the lower deck file system and ii) discards the block of host data in the digest calculation group from which the matching crypto-digest was generated.

In some embodiments, causing the hardware vector processing logic within the storage processor to simultaneously calculate multiple crypto-digests includes allocating, in a function call stack located within the storage processor, multiple context objects. Each one of the context objects corresponds to one of the blocks of host data in the digest calculation group selected from within the aggregation set. Each one of the context objects contains workspace memory for use by a digest calculation component of a shareable library while using hardware vector processing logic within the storage processor to calculate a crypto-digest from the contents of the corresponding block of host data in the digest calculation group. The multiple context objects may be passed to the digest calculation component of the shareable library to cause the digest calculation component of the shareable library to use the hardware vector processing logic within the storage processor to simultaneously calculate the multiple crypto-digests using the hardware vector processing logic.

In some embodiments, using the hardware vector processing logic within the storage processor to simultaneously calculate multiple crypto-digests may include passing an indication of a corresponding one of the blocks of host data in the digest calculation group to the digest calculation component of the shareable library with each one of context objects in the multiple context objects (e.g. in respective calls to the digest calculation component). In response to detecting that all crypto-digests in the multiple crypto-digests simultaneously calculated by the hardware vector processing logic have been completely calculated, the crypto-digests simultaneously calculated by the hardware vector processing logic may be extracted from the multiple context objects. In response to all of the crypto-digests having been extracted from the corresponding context objects, the context objects may be deallocated from the function call stack.

In some embodiments, causing the hardware vector processing logic within the storage processor to simultaneously calculate multiple crypto-digests may include allocating, in the function call stack within the storage processor, a context manager object. The context manager object corresponds to the digest calculation group selected from within the aggregation set, and contains workspace memory for use by the digest calculation component of the shareable library while the digest calculation component uses the hardware vector processing logic within the storage processor to calculate the multiple crypto-digests from the digest calculation group selected from the aggregation set.

In some embodiments, using the hardware vector processing logic within the storage processor to simultaneously calculate multiple crypto-digests may include passing an indication of the context manager object to the digest calculation component of the shareable library with each one of the context objects in the multiple context objects. In response to detecting that all of the crypto-digests have been extracted from the context objects, the context manager object may also be deallocated from the function call stack.

In some embodiments, the hardware vector processing logic is contained within at least one processing unit (e.g. a CPU) that is part of the storage processor, and the hardware vector processing logic within the storage processor includes several vector registers. The digest calculation component of the shareable library may use the hardware vector processing logic within the storage processor to simultaneously calculate the multiple crypto-digests by iteratively storing portions of each block in the digest calculation group into a corresponding vector element in a vector register to cause the vector processing logic to perform vector operations that simultaneously process the portions of each block stored in the vector register.

In some embodiments, the digest calculation component of the shared library may use the hardware vector processing logic within the storage processor to simultaneously calculate multiple crypto-digests by using the hardware vector processing logic within the storage processor to simultaneously perform a secure hash function on each one of the blocks of host data in the digest calculation group. The resulting crypto-digests may be digests that are outputs resulting from the digest calculation component of the shared library using the hardware vector processing logic within the storage processor to simultaneously perform the secure hash function on all of the blocks of host data in the digest calculation group of blocks.

In some embodiments, the lower deck file system maps files to blocks of an address space of the lower deck file system, wherein each file implements a corresponding data object that is accessible to the at least one host computer, and wherein blocks of the address space of the lower deck file system also correspond to specific portions of non-volatile storage provisioned from a set of storage devices in the data storage system that provide storage for the lower deck file system.

Embodiments of the disclosed technology may provide significant advantages over previous technologies. For example, the disclosed technology may be embodied such that the number of storage processor CPU cycles that are needed to calculate crypto-digests to provide deduplication with regard to the blocks of host data that are stored by the data storage system is significantly less than was required by previous data storage systems. As a result, embodiments of the disclosed technology may advantageously enable a data storage system to use a smaller percentage of the total amount of CPU cycles available within the storage processor to calculate the crypto-digests that are needed to support deduplication, thus enabling the data storage system to process received host I/O requests at a higher rate than was possible in previous systems. In some embodiments, by allocating the memory space for context and context manager objects in a "just in time" manner on a function call stack in order to provide work space in memory for a digest calculation component of a shared library that causes the hardware vector processing logic to simultaneously calculate crypto-digests for all blocks in a digest calculation group of blocks, the disclosed technology may advantageously avoid the large amounts of processing overhead that would otherwise be required to manage a pool of pre-allocated context and context manager objects, which would each have to be locked during the time periods they are in use.

BRIEF DESCRIPTION OF THE DRAWINGS

The foregoing and other objects, features and advantages will be apparent from the following description of particular embodiments of the disclosed technology, as illustrated in the accompanying drawings in which like reference characters refer to the same parts throughout the different views. The drawings are not necessarily to scale, emphasis instead being placed upon illustrating the principles of various embodiments of the disclosed technology.

DETAILED DESCRIPTION

Embodiments of the invention will now be described. It should be understood that such embodiments are provided by way of example to illustrate various features and principles of the invention, and that the invention hereof is broader than the specific example embodiments disclosed.

Figure 1:
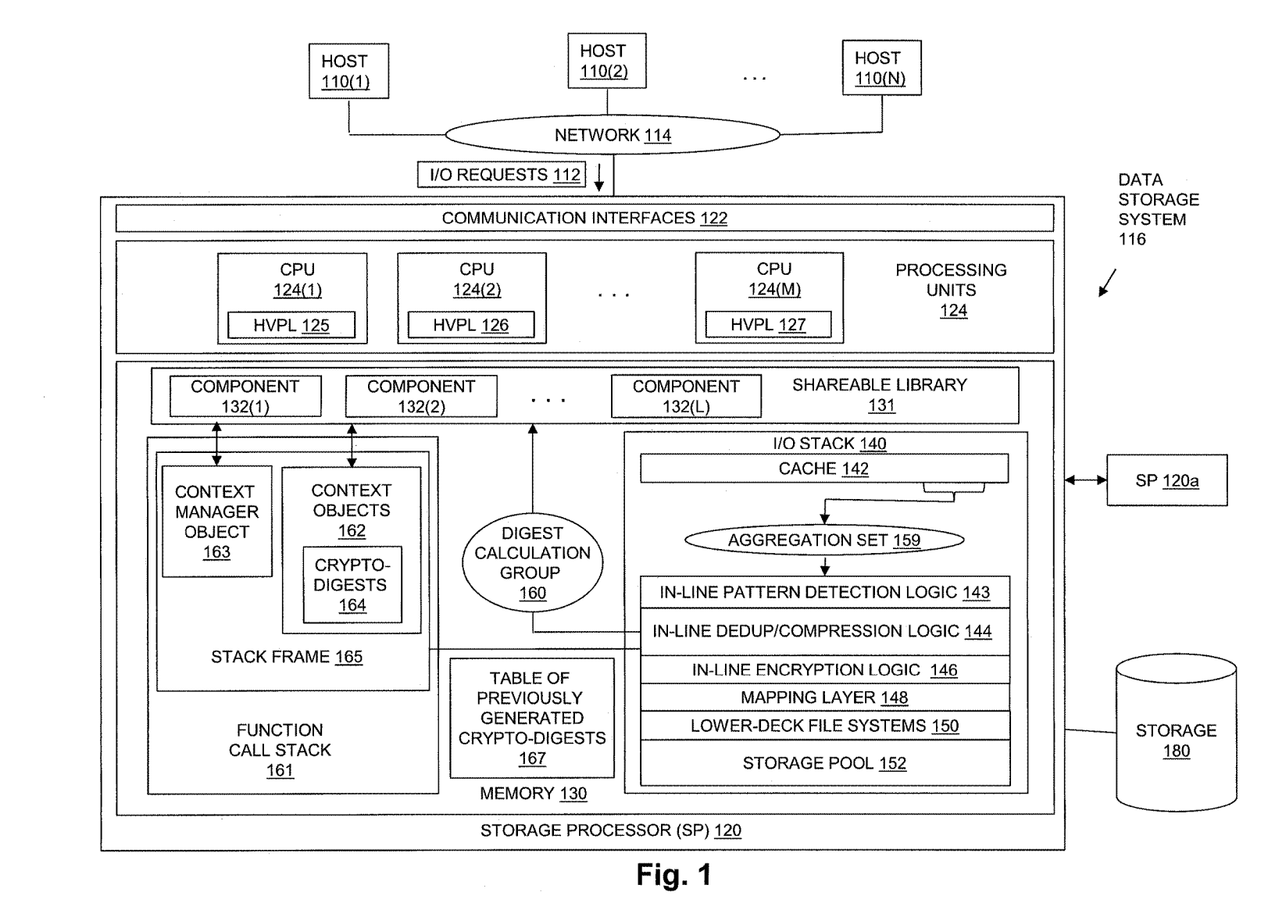
FIG. 1 is a block diagram showing an example of components in an operational environment including an embodiment of the disclosed technology.

FIG. 1 shows an example of an operational environment in which embodiments of the technology disclosed herein can operate, including an illustrative embodiment of the disclosed technology. As shown in FIG. 1, multiple host computing devices ("Hosts"), shown as devices 110(1) through 110(N), and/or host applications executing in whole or in part on devices 110(1) through 110(N), access non-volatile storage provided by a Data Storage System 116 over a Network 114. The Data Storage System 116 includes a storage processor, or "SP," 120 and Storage 180. The Data Storage System 116 may include multiple SPs like the SP 120 (e.g., a second SP, 120a). In some embodiments, multiple. SPs may be provided as circuit board assemblies, or "blades," which plug into a chassis that encloses and cools the SPs. The chassis may have a backplane for interconnecting the SPs, and additional connections may be made among SPs using cables. Those skilled in the art will recognize, however, that no particular configuration of SPs is required, as any number of SPs, including a single SP, may be provided and that SP 120 can be any type of computing device capable of processing received host I/O requests.

Storage 180 within Data Storage System 116 may, for example, take the form of RAID groups, where each RAID group is composed of multiple disk drives. The disk drives in Storage 180 may include magnetic disk drives, electronic flash drives, optical drives, and/or other types of drives. In one example, each individual RAID group includes disk drives of a single type that provide similar performance. However, the disclosed technology does not require that Storage 180 be organized in RAID groups.

Network 114 may be any type of network or combination of networks, such as, for example, a storage area network (SAN), a local area network (LAN), a wide area network (WAN), the Internet, and/or some other type of network or combination of networks. The Hosts 110(1-N), and/or host applications executing in whole or in part on Hosts 110(1-N), may connect to the Storage Processor 120 using various technologies, such as, for example, Fibre Channel, iSCSI, NFS, SMB 3.0, and CIFS. Any number of Hosts 110(1-N) and/or host applications executing in whole or in part on Hosts 110(1-N) may be provided, using any of the above protocols, some subset thereof, or other protocols besides those listed. As it is generally known, Fibre Channel and iSCSI are block-based protocols, whereas NFS, SMB 3.0, and CIFS are file-based protocols. SP 120 may be configured to receive I/O requests 112 according to both block-based and file-based protocols and to respond to such I/O requests 112 by reading or writing the Storage 180.

Storage Processor 120 may include one or more Communication Interfaces 122, a set of Processing Units 124, and Memory 130. Communication Interfaces 122 may include, for example, SCSI target adapters and network interface adapters for converting electronic and/or optical signals received over Network 114 into electronic form for use by Storage Processor 120.

The set of Processing Units 124 may include one or more processing chips and/or assemblies, shown for purposes of illustration by CPUs 124(1-M). One or more of the CPUs 124 include hardware vector processing logic ("HVPL"), shown for purposes of illustration by HVPL 125 in CPU 124(1), HVPL 126 in CPU 124(2), and HVPL 127 in CPU 124(M).

Memory 130 may include both volatile memory (e.g., RAM), and non-volatile memory, such as one or more ROMs, disk drives, solid state drives, and the like. Processing Units 124 and Memory 130 together form specialized control circuitry, which is constructed and arranged to carry out specific methods and functions as described herein. Also, Memory 130 is shown including a variety of specialized software constructs that may be provided in the form of executable instructions. When the executable instructions of the software constructs shown in FIG. 1 are executed by Processing Units 124, Processing Units 124 are caused to carry out the operations of the software constructs. Although certain specific software constructs are specifically shown in FIG. 1 and described herein, those skilled in the art will recognize that Memory 130 may further include various other types of software constructs, which are not shown, such as an operating system, various applications, processes, and daemons.

As further shown in FIG. 1, Memory 130 may include (i.e., provide by operation of programming code) an I/O stack 140. The I/O Stack 140 provides an execution path of program logic executing on Processing Units 124 for processing host I/O requests received by the Storage Processor 120, e.g. I/O Requests 112.

The I/O Stack 140 is seen to include, for example, a Cache 142, In-Line Pattern Detection Logic 143, In-Line Deduplication/Compression Logic 144, In-Line Encryption Logic 146, Mapping Layer 148, Lower-Deck File Systems 150, and Storage Pool 152. The Lower-Deck File Systems 150 store files that are used to implement data objects. For example, multiple data objects may be implemented in corresponding files stored in Lower-Deck File Systems 150. Each one of the data objects implemented by a respective file stored in one of the Lower-Deck File Systems 150 may, for example, take the form of a logical disk referred to as a LUN (Logical Unit Number) logical disk, a host file system, a VVol (virtual volume, for example a virtual machine disk, e.g., as available from VMware, Inc. of Palo Alto, Calif.), a snapshot data object that is a point-in-time copy of another data object, or some other type of data object.

Mapping Layer 148 converts I/O requests directed to each one of the data objects into corresponding reads and writes of the corresponding one of the files stored in Lower-Deck File Systems 150 that implements the data object. For example, each one of the files stored in Lower-Deck File Systems 150 may have a logical address space and a set of associated addresses within the address space of the file system that contains it. The logical address space for a file may, for example, be a monotonic range of logical offsets into the file, e.g., as tracked by one or more mapping structures of the file. A mapping structure for a file may consist of, include or be part of an "inode" data structure, and may also be stored in the one of the Lower-Deck File Systems 150 that stores the file. The set of file system address space addresses associated with a file identify the blocks used by the lower-deck file system that contains the file to store the data of the file. For purposes of example, the size of each "block" may be the size of the smallest allocatable unit of storage, such as 8 KB, for example.

In some embodiments, Cache 142 may include or consist of a circular buffer that stores host data indicated by or included in I/O Requests 112 (e.g. host data indicated by or included in write operations received in I/O Requests 112). In some embodiments, host data indicated by or included in I/O Requests 112 may be stored at a head of the circular buffer when it is received by Storage Processor 120, and subsequently flushed from a tail of the circular buffer. The circular buffer of Cache 142 may have a limited or fixed size. Accordingly, as host data is added to the head of the circular buffer, it becomes more full, and as host data is flushed from the tail of the circular buffer, it becomes less full. For example, Hosts 110(1-N), and/or host applications executing on Hosts 110(1-N), may issue I/O Requests 112 to the Data Storage System 116. The Storage Processor 120 receives I/O Requests 112 at Communication Interfaces 122, and passes the I/O Requests 112 to the I/O Stack 140 for further processing. Each write request in I/O Requests 112 may specify a data object, and indicate (e.g. include) data that is to be written to the specified data object. For each one of the write requests received by Storage Processor 120, the specified data may initially be stored in Cache 142 when the write request is received by Storage Processor 120, e.g. at the head of the circular buffer. Storage Processor 120 may also provide an acknowledgment to the host that issued the write request once the data indicated by the write request has been securely stored in Cache 142. Such an acknowledgement indicates successful completion of the write request by the Data Storage System 116. The above process may be repeated for additional write requests specifying additional data to be written to various locations of the same data object. Cache 142 accumulates the host data specified in these requests, e.g., at the head of the circular buffer in the order the data is received, and provides an acknowledgement in response to each request. In this way, host data specified by one or more write requests directed to a data object may be accumulated over time in Cache 142. In addition, in some embodiments, host data indicated for retrieval by one or more read requests in I/O Requests 112 may also be accumulated over time in Cache 142.

Each write request may specify not only the data to be written but also the location at which the specified data is to be written relative to the specified data object. For example, if the specified data object is a LUN, the write request may specify the location of the data within the LUN as an offset into the LUN. If the data object is a host file system, the write request may specify the location at which the data is to be written by file name and an offset into the named file. Mapping Layer 148 maps the specified data object to a respective lower deck file that is used to implement the data object, and also maps the various data location indicators to a set of logical offsets within that file. The lower-deck file system (e.g. one of Lower-Deck File Systems 150) that stores the file further maps these logical offsets to addresses of blocks of non-volatile storage provisioned from Storage 180. In some cases, the data to be written is directed to blocks for which non-volatile storage has already been allocated and mapped by the file system that stores the container file, such that the data overwrites of previously stored blocks of host data. In other cases, the data to be written is directed to locations in the file system address space to which associated physical storage has not yet been provisioned, such that the file system must allocate new blocks of non-volatile storage to the container file in order to store the received data.

At some point in the course of accumulating host data that is indicated by one or more write requests (or read requests) into Cache 142, a cache flush event is detected, e.g. by Cache 142 or some other component of the I/O Stack 140. The cache flush event indicates that multiple blocks of host data accumulated in the circular buffer of Cache 142 are to be flushed from Cache 142, e.g. To at least one lower deck file system in Lower-Deck File Systems 150, for storage through the lower deck file system into non-volatile storage within Storage 180. As a result of such flushing of host data from Cache 142, an increased amount of space within the circular buffer of Cache 142 becomes available to store host data indicated by subsequently received requests. Examples of cache flush events include detecting that the circular buffer has reached or exceeded a predetermined or configured threshold maximum level of fullness (e.g. 80% full, 90% full, etc.), and/or detecting the expiration of a predetermined time period since one or more blocks of host data were stored into the circular buffer.

In response to detecting the cache flush event, Aggregation Set 159 is formed, e.g. by Cache 142 or some other part of I/O Stack 140. Aggregation Set 159 consists of a subset of the blocks of host data that have been accumulated in Cache 142. The blocks of host data contained in Aggregation Set 159 may, for example, consist of some number of the blocks of host data that are located at a tail of the circular buffer in Cache 142, e.g. a set of the oldest blocks of host data that are stored in Cache 142.

In-Line Pattern Detection Logic 143 performs pattern detection on the blocks of host data in Aggregation Set 159, in order to identify blocks that contain one or more predetermined data patterns, e.g. all zeros, etc. In the case where In-Line Pattern Detection Logic 143 determines that a block of host data within Aggregation Set 159 contains a predetermined data pattern, In-Line Pattern Detection Logic 143 causes an indication of the specific data pattern to be stored in metadata associated with the location of that block, e.g. in metadata associated with the location of the block stored within Mapping Layer 148 and/or Lower-Deck File Systems 150, and no further processing of that block needs to be performed, e.g. by In-Line Deduplication/Compression Logic 144, In-Line Encryption Logic 146, etc.

In-Line Deduplication/Compression Logic 144 performs in-line data deduplication and/or in-line data compression on the blocks of host data in Aggregation Set 159. While performing in-line data deduplication on Aggregation Set 159, In-Line Deduplication/Compression Logic 144 responds to the formation of Aggregation Set 159 by selecting at least one digest calculation group of blocks from within Aggregation Set 159. In-Line Deduplication/Compression Logic 144 then causes hardware vector processing logic (e.g. HVPL 125, HVPL 126, or HVPL 127) to simultaneously calculate crypto-digests for all of the blocks within the digest calculation group. For purposes of illustration, FIG. 1 shows Digest Calculation Group 160 selected from Aggregation Set 159, and a set of Crypto-Digests 164 that are simultaneously calculated from corresponding ones of the blocks in Digest Calculation Group 160. Each individual crypto-digest in Crypto-Digests 164 is calculated from a corresponding one of the blocks in the Digest Calculation Group 160.

The specific number of blocks contained in Digest Calculation Group 160 may be less than or equal to a maximum number of crypto-digest calculations that can be performed simultaneously by the hardware vector processing circuitry. However, the specific number of blocks contained in Digest Calculation Group 160 may not be greater than the maximum number of crypto-digest calculations that can be performed simultaneously by the hardware vector processing circuitry. The maximum number of digest calculations that can be performed simultaneously by the hardware vector processing circuitry is sometimes referred to as the number of "lanes" of parallel calculations that are performed by the hardware vector processing logic, and may depend on i) the size of a vector register that is used to store operands in the hardware vector processing circuitry, and ii) the specific type of cryptographic hash function that is used to calculate the Crypto-Digests 164. For example, when using the secure hash algorithm known as SHA-256 to calculate Crypto-Digests 164, 32 bits of "state" are required to be maintained in a CPU register for each one of the simultaneous calculations. Accordingly, in embodiments in which the vector register is 128 bits in length, the vector register can be used to simultaneously store the state for 4 SHA-256 calculations, and the maximum number of SHA-256 digest calculations that can be performed simultaneously by the hardware vector processing circuitry is 4. However, in embodiments in which the vector register is 256 bits in length, the vector register can be used to simultaneously store the state for 8 SHA-256 calculations, and the maximum number of SHA-256 digest calculations that can be performed simultaneously by the hardware vector processing circuitry is 8. And in embodiments in which the vector register is 512 bits in length, the vector register can be used to simultaneously store the state for 16 SHA-256 calculations, and the maximum number of SHA-256 digest calculations that can be performed simultaneously by the hardware vector processing circuitry is 16.

When using the secure hash algorithm known as SHA-512 to calculate Crypto-Digests 164, 64 bits of "state" are required to be maintained in a CPU register for each one of the simultaneous calculations. Accordingly, in embodiments or configurations that use SHA-512 to calculate the Crypto-Digests 164, and in which the vector register is 128 bits in length, the vector register can simultaneously store the state for 2 SHA-512 calculations, and the maximum number of digest calculations that can be performed simultaneously by the hardware vector processing circuitry is 2. However, in embodiments in which the vector register is 256 bits in length, the vector register can simultaneously store the state for 4 SHA-512 calculations, and the maximum number of SHA-512 digest calculations that can be performed simultaneously by the hardware vector processing circuitry is 4. And in embodiments in which the vector register is 512 bits in length, the vector register can simultaneously store the state for 8 SHA-512 calculations, and the maximum number of SHA-512 digest calculations that can be performed simultaneously by the hardware vector processing circuitry is 8.

In some embodiments, one or more of Processing Units 124 may be embodied as a microprocessor that includes what are generally known as AVX (Advanced Vector eXtensions) extensions to the x86 instruction set for microprocessors. For example, one or more of the Processing Units 124 may be embodied as a microprocessor with what are specifically known as the AVX2 extensions to the x86 instruction set, and accordingly provide vector registers (sometimes referred to as "media registers") of 256 bits in length and hardware vector processing logic for processing instructions that operate on the contents of those registers (e.g. by operations including addition, bit shift, bit XOR, and other operations). Alternatively, or in addition, one or more of the Processing Units 124 may be embodied as a microprocessor with what are specifically referred to as the AVX-512 extensions to the x86 instruction set, and accordingly provide vector registers of 512 bits in length and hardware vector processing logic for processing instructions that operate on the contents of those registers.

While the specific number of blocks that may be contained in Digest Calculation Group 160 may not be greater than the maximum number of crypto-digest calculations that can be performed simultaneously by the hardware vector processing circuitry, the number of blocks in Aggregation Set 159 may be greater than or less than the maximum number of crypto-digest calculations that can be performed simultaneously by the hardware vector processing circuitry. Accordingly, in order to calculate crypto-digests for all blocks in Aggregation Set 159, one or more digest calculation groups may need to be selected from Aggregation Set 159. For example, in an example in which Aggregation Set 159 contains 12 blocks, and the maximum number of crypto-digest calculations that can be performed simultaneously by the hardware vector processing circuitry is 8, a first digest calculation group may be selected having 8 blocks from Aggregation Set 159, and then a second digest calculation set selected having the remaining 4 blocks. In another example, in which Aggregation Set 159 contains 12 blocks, and the maximum number of crypto-digest calculations that can be performed simultaneously by the hardware vector processing circuitry is 16, a single digest calculation group may be selected that contains all 12 blocks of the Aggregation Set 159.

Each one of the multiple crypto-digests in Crypto-Digests 164 that were generated from Digest Calculation Group 160 is compared by In-Line Deduplication/Compression Logic 144 to at least one previously generated crypto-digest that was generated from a block of data that was previously flushed from the Cache 142 to Lower Deck File Systems 150. For example, the disclosed technology may maintain a Table of Previously Generated Crypto-Digests 167 that stores some limited number of crypto-digests that were previously generated from blocks of host data that were flushed from Cache 142 to Lower Deck File Systems 150. Table of Previously Generated Crypto-Digests 167 may also store indications (e.g. logical offsets, pointers, etc.) of the blocks of host data from which the crypto-digests stored in Table of Previously Generated Crypto-Digests 167 were each previously generated. Table of Previously Generated Crypto-Digests 167 may store a limited number of crypto-digests, e.g. crypto-digests generated from some limited number of most recently flushed blocks of user data. Alternatively, Table of Previously Generated Crypto-Digests 167 may be embodied as a database storing crypto-digests generated from all blocks of previously flushed host data.

In response to detecting that one of the crypto-digests in Crypto-Digests 164 matches one of the previously generated crypto-digests stored in the Table of Previously Generated Crypto-Digests 167, a deduplication operation is performed by In-Line Deduplication/Compression Logic 144 on the block of host data in the Digest Calculation Group 160 from which the matching crypto-digest was generated. The deduplication operation i) causes the Lower Deck File Systems 150 to store an additional indication of the block of data that was previously flushed from the Cache 142 to the Lower Deck File Systems 150 and ii) discards the block of host data in the Digest Calculation Group 160 from which the matching crypto-digest was generated.

In some embodiments, In-Line Deduplication/Compression Logic 144 may allocate, within a Function Call Stack 161 located in Memory 130, multiple context objects, shown in FIG. 1 by Context Objects 162, and then pass the Context Objects 162 to one of the Components 132 in a Shareable Library 131 (the "digest calculation component") that uses the hardware vector processing logic within one of the Processing Units 124 to calculate a crypto-digest from a corresponding one of the blocks of data in the Digest Calculation Group 160. Each one of the context objects in Context Objects 162 corresponds to one of the blocks in the Digest Calculation Group 164. Accordingly, the specific number of context objects in Context Objects 162 is the same as the number of blocks in the Digest Calculation Group 160. Each one of the context objects in Context Objects 162 contains workspace memory for use by the digest calculation component while the digest calculation component uses the hardware vector processing logic within one of the Processing Units 124 to calculate a crypto-digest from the corresponding one of the blocks of data in the Digest Calculation Group 160. Each one of the context objects in Context Objects 162 may also contain workspace to store the resulting crypto-digest that is calculated for the corresponding one of the blocks in Digest Calculation Group 160, e.g. as one of the crypto-digests contained in Crypto-Digests 164. In some embodiments, individual ones of the Context Objects 162 may be passed to the digest calculation component when the digest calculation component is repeatedly called to cause the digest calculation component to use the hardware vector processing logic within one of the Processing Units 124 to calculate the crypto-digests for the blocks in the Digest Calculation Group 160.

In some embodiments, In-Line Deduplication/Compression Logic 144 may also allocate, also within the Function Call Stack 161, a context manager object, shown in FIG. 1 by Context Manager Object 163. Context Manager Object 163 corresponds to the Digest Calculation Group 164. A new Context Manager Object 163 is allocated for each digest calculation group that is selected. Context Manager Object 163 contains workspace memory for use by the digest calculation component while the digest calculation component uses the hardware vector processing logic within one of the Processing Units 124 to simultaneously calculate the Crypto-Digests 164 from the blocks of data in the Digest Calculation Group 160. For example, Context Manager Object 163 may be passed to the digest calculation component each time the digest calculation component is called to cause the digest calculation component to use the hardware vector processing logic within one of the Processing Units 124 to calculate a crypto-digest for one of the blocks in Digest Calculation Group 160. The digest calculation component may, for example, use the memory workspace provided in Context Manager Object 163 to keep track of which and how many processing lanes have been filled in the hardware vector processing logic, and to cause the simultaneous calculation of crypto-digests for the blocks in Digest Calculation Group 160 to be started in response to detecting that i) all processing lanes have been filled in the hardware vector processing logic, or ii) all blocks of host data in Digest Calculation Group 160 have been passed to the digest processing component.

In some embodiments, Shareable Library 131 may consist of or include the Intel® Intelligent Storage Acceleration Library (Intel® ISA-L). As it is generally known, ISA-L is a collection of optimized low-level functions that include individual functions that implement cryptographic hash functions such as SHA-256 and SHA-512, and that use the AVX extensions to the x86 instruction set to perform multiple calculations in parallel to provide high performance. In the example of FIG. 1, Shareable Library 131 is shown including Components 132(1-L). One of the Components 132 may be a digest calculation component that implements SHA-256, another one of the Components 132 may be a digest calculation component that implements SHA-512, and other ones of the Components 132 may be digest calculation components that implement other specific cryptographic has functions. In some embodiments or configurations, the digest calculation component may be the function in ISA-L that implements SHA-256. In other embodiments or configurations, the digest calculation component may be the function in ISA-L that implements SHA-512. In still other embodiments, the digest calculation component may be a function in ISA-L that implements some other cryptographic hashing function.

In order to allocate Context Objects 162 and Context Manager 163 in Stack Frame 165, In-Line Deduplication/Compression Logic 144 may define the Context Objects 162 and Context Manager 163 as local variables within a function that repeatedly calls the digest calculation component in Shareable Library 131, i.e. within a function that calls the digest calculation component once for each block in the Digest Calculation Group 161.

When In-Line Deduplication/Compression Logic 144 calls the function within In-Line Deduplication/Compression Logic 144 that repeatedly calls the digest calculation component, Stack Frame 165 is automatically pushed onto the Function Call Stack 161, and the Context Objects 162 and Context Manager Object 163 are automatically allocated in Memory 130 within the Function Call Stack 161 as part of the Stack Frame 165.

As it is generally known, a call stack such as Function Call Stack 161 contains a set of stack frames. Each stack frame in Function Call Stack 161 corresponds to a call made by program code executing in Storage Processor 120 to a function that has not yet terminated with a return. Each stack frame in Function Call Stack 161 includes any parameter values passed to the function, a return address back to the caller of the function, space for locally defined variables of the function, and a saved value of the pointer to the top of Function Call Stack 161 at the time when the function was called, sometimes referred to as the base pointer. For example, in the disclosed technology, Stack Frame 165 is automatically generated in response to a call to the function called by In-Line Deduplication/Compression Logic 144 that repeatedly calls the digest calculation component in the Shareable Library 131 to generate Crypto-Digests 164 from Digest Calculation Group 160, and may include the following:

i) Saved Function Call Return Address (8 bytes)
ii) Saved base pointer (8 bytes)
iii) Context Manager Object 163 (848 bytes)
iv) Context Objects 162 (320 bytes each)
v) Any other local function variables
. . .

In some embodiments, an indication of a corresponding one of the blocks of host data in Digest Calculation Group 160 may be passed to the digest calculation component in Shareable Library 131 with each one of context objects in Context Objects 162. In response to detecting that all crypto-digests in Crypto-Digests 164 have been completely calculated, In-Line Deduplication/Compression Logic 144 extracts copies of Crypto-Digests 164 from the Context Objects 162. When copies of all of the crypto-digests in Crypto-Digests 164 have been extracted from Context Objects 162, the function in In-Line Deduplication/Compression 144 that repeatedly called the digest calculation component in Shareable Library 131 may return, causing the Stack Frame 161 to be removed (popped) from the Function Call Stack 161, so that Context Objects 162 and Context Manager Object 163 are thus deallocated from the function call stack.

The below code sample illustrates part of the code within a function that is defined within In-Line Deduplication/Compression Logic 144, and that repeatedly calls a digest calculation component in Shareable Library 131 that uses the hardware vector processing logic within one of the Processing Units 124 to calculate a crypto-digest from a corresponding one of the blocks of data in the Digest Calculation Group 160. In the code sample, context objects ("ctx") and a context manager object ("mgr") are defined as local variables to be allocated on the function call stack when the function is called. In the below example, the function sha512_ctxmgr_init_avx2 initializes the context manager object, and hash_ctx_init initializes the context objects. ISALMAX LANES is the maximum number of digest calculations that can be performed simultaneously by the hardware vector processing circuitry. The function sha512_ctx_mgr_submit_avx2 is a digest calculation component in Shareable Library 131 that implements SHA-512, and data_array contains the blocks of host data in the Digest Calculation Group 160.

```
SHA512_HASH_CTX_MGR mgr;
SHA512_HASH_CTX ctx[ISAL_MAX_LANES];
sha512_ctxmgr_init_avx2(&mgr);
for (j=0; j<ISAL_MAX_LANES; j++) hash_ctx_init(&ctx[j]);
for (ctx_idx=0; ctx_idx<ISAL_MAX_LANES; ctx_idx++)
{
    usr_idx=buf_idx; // tag the context to help sorting out the results
    ctx[ctx_idx].user_data=(void *) usr_idx;
    pctx=sha512_ctx_mgr_submit_avx2(// One digest calculation
        &mgr,
        &ctx[ctx_idx], //one context object
        &data_array[usr_idx].databytes[0], //one host data block
        c_len, // host data length
        HASH_ENTIRE); //calculate across entire contiguous block
    if (pctx && pctx->error)
        printf ("Submit %d error %d \n",ctx_idx,pctx->error);
    buf_idx++; // next block in group to calculate digest for
}
```

When In-Line Deduplication/Compression Logic 144 detects that all the crypto-digests in Crypto-Digests 164 have been calculated and stored by the digest calculation component into the context objects in ctx, copies of the calculated crypto-digests can be extracted from the context objects, and the function that calls the digest calculation component returns. When the function returns, Stack Frame 165 is popped off the Function Call Stack 161, effectively deallocating the memory space on the Function Call Stack 161 that was allocated for Context Objects 162 and Context Manager Object 163.

The blocks of host data in Aggregation Set 159 that i) do not contain a predetermined data pattern detected by In-Line Pattern Detection Logic 143, and ii) do not have a crypto-digest that matches one of the previously generated crypto-digests stored in the Table of Previously Generated Crypto-Digests 167, may then be compressed by In-Line Deduplication/Compression Logic 143. The specific type of data compression performed by In-Line Deduplication/Compression Logic 144 may be any type of lossless compression that identifies and eliminates statistical redundancy or redundancies in the host data, in such a way that the resulting compressed data may be decompressed without any loss of information.

In some embodiments, In-Line Encryption Logic 146 may perform in-line encryption of compressed data that is generated by In-Line Deduplication/Compression Logic 144. The encryption performed may be data object specific. The specific type of encryption performed may, for example, consist of or include symmetric-key encryption, in which the same key may be used for both encryption and decryption, and/or asymmetric-key encryption, in which different keys are used for encryption and decryption.

Figure 2:
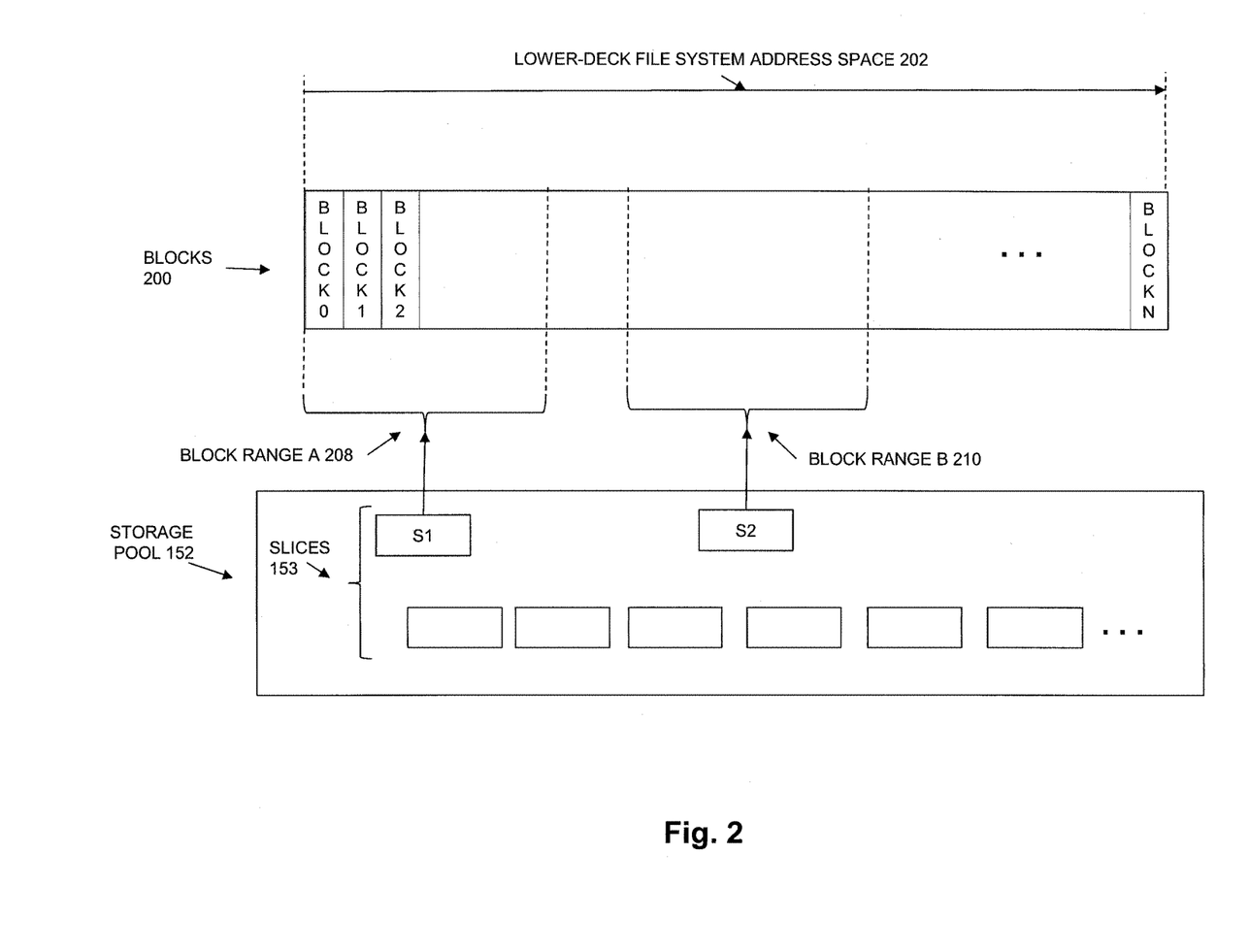
FIG. 2 is a block diagram showing an example of how blocks of addresses may be provided within an address space of a lower-deck file system, and showing an example of how blocks within the address space of the lower-deck file system may correspond to slices of non-volatile storage that are provisioned from one or more non-volatile storage devices to store the blocks of host data written to the corresponding blocks of the lower-deck file system address space.

Lower-Deck File Systems 150 organize and incorporate the compressed and potentially encrypted data into the Storage 180, using slices of non-volatile storage in Storage 180 that are provisioned from Storage Pool 152, as further illustrated in FIG. 2.

FIG. 2 is a block diagram showing an example of blocks within an address space of a file system in Lower-Deck File Systems 150, and showing examples of ranges of blocks within the address space of the file system, each of the block ranges corresponding to at least a portion of a slice of storage provisioned from a non-volatile storage device that is used to store the contents of the blocks of the address space within the respective block range. In the example of FIG. 2, Blocks 200 (e.g. Block 0 through Block N) are provided within a File System Address Space 202 of one of the file systems in Lower-Deck File Systems 150. The file system organizes units of non-volatile storage (e.g. slices of disk storage) that are allocated from Storage 180 to the file system through the shared Storage Pool 152, e.g. using a storage pool manager process or the like executing on Storage Processor 120. Similarly, the file system may operate to return units of non-volatile storage to the shared Storage Pool 152 when such non-volatile storage is no longer needed. The Storage Pool 152 organizes elements of the Storage 180 into Slices 153. A "slice" is an example of a unit of storage space (e.g. 256 megabytes or 1 gigabytes in size), which is derived from Storage 180. In the example of FIG. 2, at least a portion of the slice S1 has been allocated from Storage Pool 152 to provide non-volatile storage for the host data stored within the blocks of the File System Address Space 202 that are located within Block Range A 208, and at least a portion of the slice S2 has been allocated from Storage Pool 152 to provide non-volatile storage for the host data stored within the blocks of the File System Address Space 202 that are located within Block Range B 210.

Figure 3:
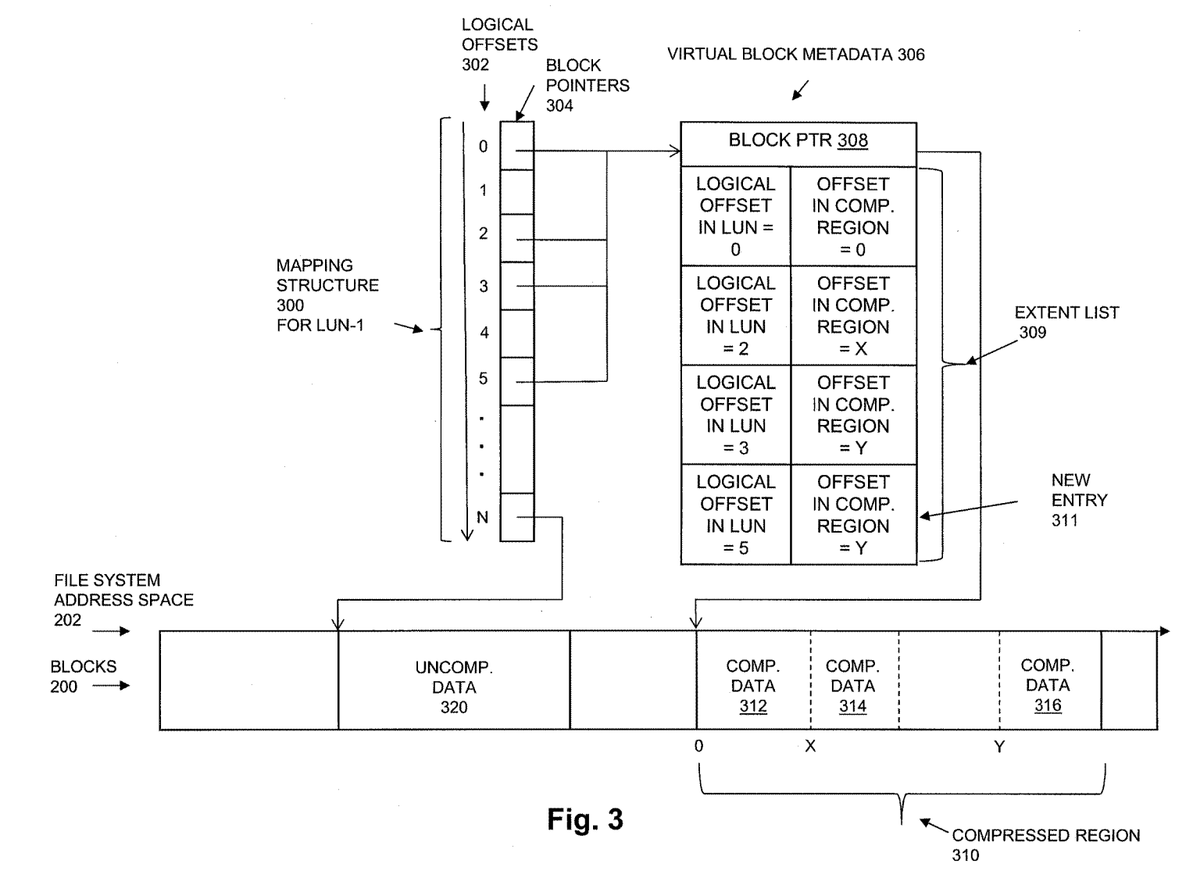
FIG. 3 is a block diagram showing an example of blocks of host data stored within the file system address space, and of a mapping structure for a data object and associated metadata that may be used to indicate locations within the address space of the lower-deck file system at which compressed and/or uncompressed extents of host data may be stored.

FIG. 3 is a block diagram showing an example of host data stored within the file system address space. The example of FIG. 3 shows a lower deck file system mapping structure for a file that implements a data object, and metadata associated with the mapping structure that may be used to indicate locations within the address space of the lower-deck file system at which compressed and/or uncompressed extents of host data are located that correspond to block offsets within the file. In the example of FIG. 3, a Mapping Structure 300 (e.g. within an Mode structure) for a file that implements a LUN data object LUN-1 in the Lower Deck File Systems 150 is indexed (e.g. by components in I/O Stack 140) using Logical Offsets 302, in order to store and/or access specific blocks of host data within LUN-1. Each one of Logical Offsets 302 corresponds to one of the Block Pointers 304 in the Mapping Structure 300. Each one of Block Pointers 304 maps a block within the file that implements LUN-1 to a location within the File System Address Space 202 at which is stored the host data for that block. Accordingly, a pointer in Block Pointers 304 corresponding to logical offset zero maps I/O requests that indicate the block at logical offset zero of the file that implements LUN-1 to a location within the File System Address Space 202 at which is stored the host data for block zero of the file that implements LUN-1, a pointer in Block Pointers 304 corresponding to logical offset one maps I/O requests that indicate the block at logical offset one of the file that implements LUN-1 to a location within the File System Address Space 202 that stores the host data for block one of the file that implements LUN-1, and so on. In the case of blocks of uncompressed host data, a corresponding pointer in Block Pointers 304 points directly to the location of the uncompressed data within the File System Address Space 202. For example, as shown in FIG. 3, in the case where block N of the file that implements LUN-1 has not been compressed, the pointer in Block Pointers 304 corresponding to logical offset N points directly to the location in File System Address Space 202 of Uncompressed Data 320.

In the case of a compressed block of host data within the file that implements LUN-1, a corresponding pointer in Block Pointers 304 points to virtual block metadata that indicates the location of the compressed data within a region of compressed data in the File System Address Space 202. In the example of FIG. 3, Compressed Region 310 is a region of compressed data within the File System Address Space 202. Compressed Region 310 contains multiple extents of previously compressed host data. Virtual Block Metadata 306 is a data structure in the Lower Deck File Systems 150 that stores a Block Pointer 308 indicating the location of the Compressed Region 310 within the File System Address Space 202. Virtual Block Metadata 306 also stores an Extent List 309 having multiple entries. Each entry in the Extent List 309 indicates a logical offset into the Compressed Region 310 at which is located an extent of compressed data that was generated from a specific block of host data in the file that implements LUN-1. Each extent entry may also store a length of the extent of compressed data indicated by that extent entry, and/or other metadata describing the extent of compressed data that is indicated by the extent entry (e.g. the specific compression algorithm used to compress the extent, whether the extent is encrypted and if so the type of encryption used, etc.). In the example of FIG. 3, the block pointers for the logical offsets 0, 2, and 3 indicate Virtual Block Metadata 306, since the host data for the blocks at offsets 0, 2 and 3 of the file that implements LUN-1 has been compressed. The Extent List 309 indicates that the compressed host data for the block at logical offset 0 of the file that implements LUN-1 is located beginning at offset 0 of Compressed Region 310, as shown by Compressed Data 312. Also in the example of FIG. 3, the Extent List 309 indicates that the compressed host data for the block at logical offset 2 of the file that implements LUN-1 is located beginning at offset X of Compressed Region 310, as shown by Compressed Data 314. Further in the example of FIG. 3, the Extent List 309 indicates that the compressed host data for the block at logical offset 3 of the file that implements LUN-1 is located beginning at offset Y of Compressed Region 310, as shown by Compressed Data 316.

When a block of host data written by one or more write I/O requests that were directed to the block located at logical offset 5 of the file that implements LUN-1 is flushed from the Cache 142, In-Line Deduplication/Compression Logic 144 compares the crypto-digest generated from that block of host data to crypto-digests previously generated from blocks of host data that were written to the blocks located at logical offsets 0, 2, and 3 of the file that implements LUN-1. In response to detecting that the crypto-digest generated from the block of host data written to the block at logical offset 5 of the file that implements LUN-1 matches a crypto-digest previously generated from the block of host data located at logical offset 3 of the file that implements LUN-1, the In-Line Deduplication/Compression Logic 144 performs a deduplication operation that i) causes the Lower Deck File Systems 150 to a) store an additional entry (New Entry 311) in the Extent List 309 that indicates that an extent of compressed host data equal to a compressed version of the block of host data located at logical offset 5 of the file that implements LUN-1 is located beginning at offset Y of Compressed Region 310 (as shown by Compressed Data 316), and b) store a pointer to Virtual Block Metadata 306 in Block Pointers 304 corresponding to logical offset 5, and ii) discards the host data directed to the block located at logical offset 5 of the file that implements LUN-1 that was flushed from the Cache 142. In this way the disclosed technology advantageously avoids storing a duplicate copy of the host data from which Compressed Data 316 was generated, by creating New Entry 311 in the Extent List 309 that stores an additional indication of the location of Compressed Data 316 albeit in association with the logical offset 5, and storing a pointer to Virtual Block Metadata 306 as the block pointer corresponding to logical offset 5 in the Mapping Structure 300.

Figure 4:
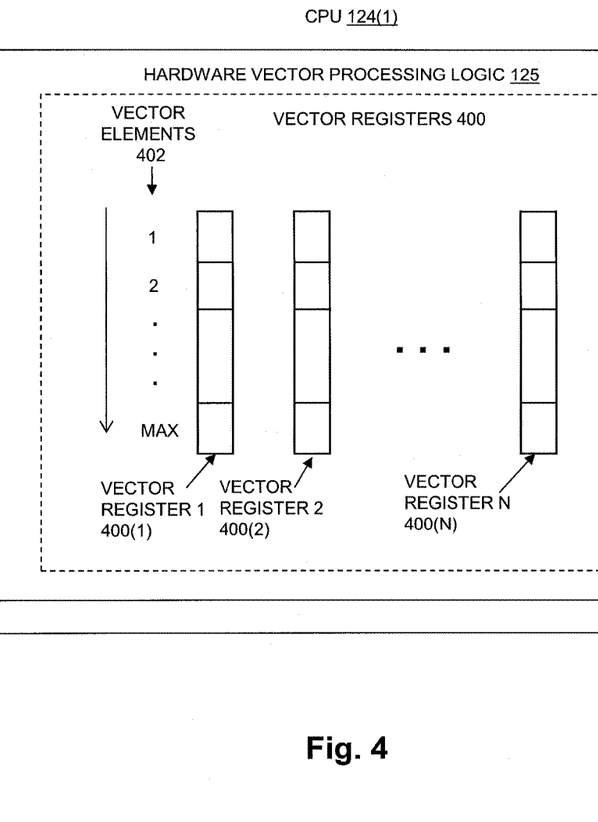
FIG. 4 is a block diagram showing an example of a CPU that includes hardware vector processing logic with a number of vector registers that may each be divided into vector elements for purposes of performing vector operations.

FIG. 4 is a block diagram showing an example of a CPU that includes hardware vector processing logic with a number of vector registers that are each divided into vector elements. In the example of FIG. 4, CPU 124(1) includes Hardware Vector Processing Logic 125. Hardware Vector Processing Logic 125 includes Vector Registers 400, shown by Vector Register 1 400(1), Vector Register 2 400(2), and so on through Vector Register N 400(N). As shown in FIG. 4, each one of the Vector Register 400 may be divided into MAX Vector Elements 402. For each one of the Vector Registers 400, the maximum number of digest calculations that can be performed simultaneously by Hardware Vector Processing Logic 125 (generally referred to as the number of "lanes" of parallel calculations that can be performed) is equal to MAX. For example, in an embodiment or configuration using SHA-256 to calculate the crypto-digests, 32 bits of "state" must be stored in each one of the Vector Elements 402 of at least one of the Vector Registers 400. Accordingly, in the case where each of the Vector Registers 400 is 128 bits in length, each one of the Vector Registers 400 can be used to simultaneously store the state for 4 SHA-256 calculations, and MAX is 4. In an embodiment in which each one of the Vector Registers 400 is 256 bits in length (e.g. as in a microprocessor with AVX2 extensions to the x86 instruction set), the Vector Registers 400 can be used to simultaneously store the state for 8 SHA-256 calculations, and MAX is 8. In an embodiment in which each one of the Vector Registers 400 is 512 bits in length (e.g. as in a microprocessor with AVX-512 extensions to the x86 instruction set), each one of the Vector Registers 400 can be used to simultaneously store the state for 16 SHA-256 calculations, and MAX is 16.

In another example, in an embodiment or configuration using SHA-512 to calculate the crypto-digests, 64 bits of "state" must be stored in each one of the Vector Elements 402 of at least one of the Vector Registers 400. Accordingly, in the case where each of the Vector Registers 400 is 128 bits in length, each one of the Vector Registers 400 can be used to simultaneously store the state for 2 SHA-512 calculations, and MAX is 2. In an embodiment in which each one of the Vector Registers 400 is 256 bits in length (e.g. as in a microprocessor with AVX2 extensions to the x86 instruction set), the Vector Registers 400 can be used to simultaneously store the state for 4 SHA-512 calculations, and MAX is 4. In an embodiment in which each one of the Vector Registers 400 is 512 bits in length (e.g. as in a microprocessor with AVX-512 extensions to the x86 instruction set), each one of the Vector Registers 400 can be used to simultaneously store the state for 8 SHA-256 calculations, and MAX is 8.

During operation of the disclosed technology, the digest calculation component may use the Hardware Vector Processing Logic 125 to simultaneously calculate up to MAX crypto-digests by iteratively storing portions of each block of host data in a digest calculation group into a corresponding vector element in at least one of the Vector Registers 400 to cause the Hardware Vector Processing Logic 125 to perform vector operations that simultaneously process the stored portions of each block of host data. In this way the disclosed technology may use the Hardware Vector Processing Logic 125 to simultaneously perform a secure hash function on each one of the blocks of host data in a digest calculation group.

Figure 5:
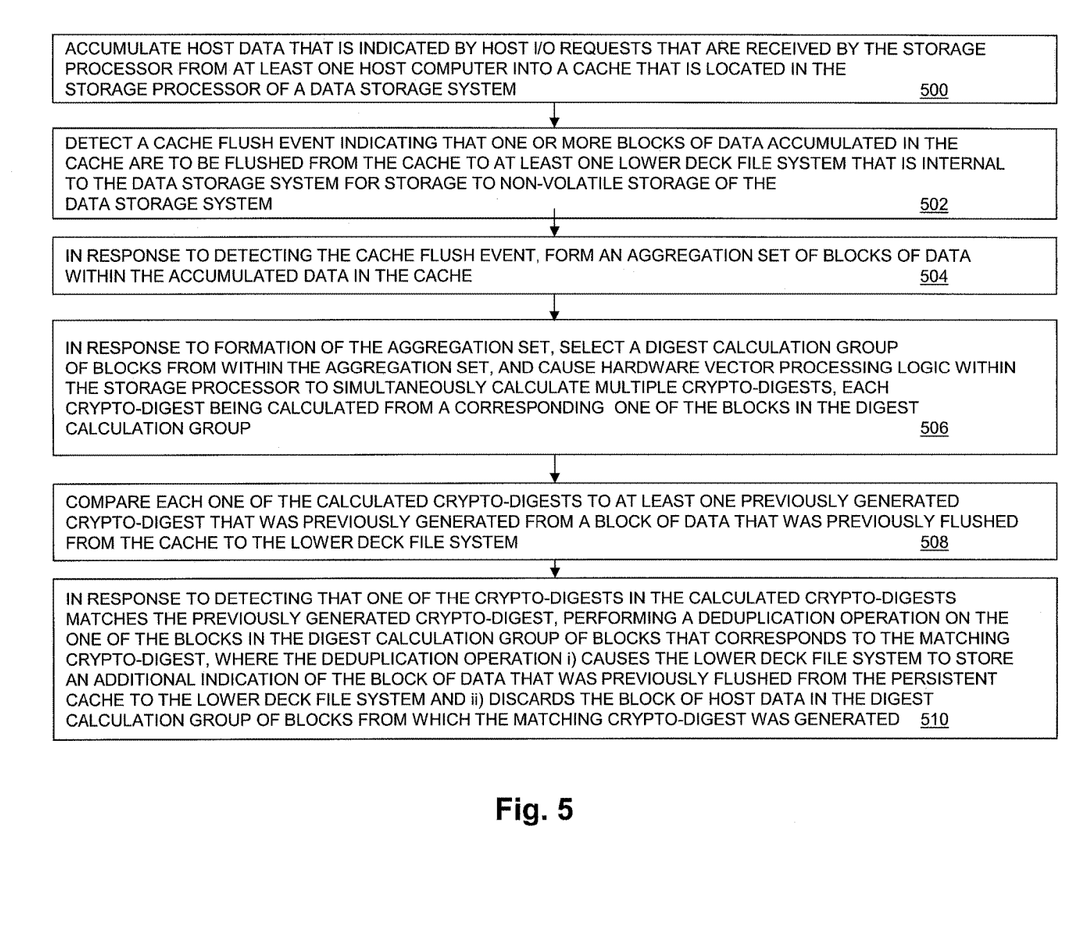
FIG. 5 is a flow chart showing an example of steps performed during operation of some embodiments of the disclosed technology.

FIG. 5 is a flow chart showing an example of steps performed during operation of an illustrative embodiment of the disclosed techniques. The steps of FIG. 5 may, for example, be performed at least in part by execution of the I/O Stack 140 and/or Shareable Library 131 shown in FIG. 1.

At step 500, host data indicated by at least one host I/O request received by a storage processor from at least one host computer is accumulated into a cache located in the storage processor of a data storage system.

At step 502, a cache flush event is detected. The cache flush event indicates that one or more blocks of data accumulated in the cache are to be flushed from the cache to at least one lower deck file system that is internal to the data storage system, and that is supported by non-volatile storage allocated from one or more non-volatile storage devices of the data storage system.

At step 504, in response to detection of the cache flush event, an aggregation set is formed consisting of blocks of host data from within the accumulated data stored in the cache.

At step 506, in response to formation of the aggregation set, a digest calculation group of blocks is selected from within the aggregation set, and hardware vector processing logic within the storage processor is caused to simultaneously calculate multiple crypto-digests, each crypto-digest being calculated from a corresponding one of the blocks in the digest calculation group.

At step 508, each one of the calculated crypto-digests is compared to at least one previously generated crypto-digest that was previously generated from a block of host data that was previously flushed from the cache to the lower deck file system.

At step 510, in response to detecting that one of the crypto-digests in the calculated crypto-digests matches the previously generated crypto-digest, a deduplication operation is performed on the block in the digest calculation group from which the matching crypto-digest was generated, where the deduplication operation i) causes the lower deck file system to store an additional indication of the block of data that was previously flushed from the cache to the lower deck file system and ii) discards the block of host data in the digest calculation group of blocks from which the matching crypto-digest was generated.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art will readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of providing data deduplication in a storage processor of a data storage system, comprising the steps of:
   causing hardware vector processing logic within the storage processor to simultaneously calculate a plurality of crypto-digests, each crypto-digest in the plurality of crypto-digests being calculated from a corresponding one of the blocks in a digest calculation group of blocks of data indicated by host I/O requests received by the storage processor from at least one host computer;
   comparing each one of the plurality of crypto-digests to at least one previously generated crypto-digest that was previously generated from a block of data that was previously flushed from the cache to the lower deck file system; and
   in response to detecting that one of the crypto-digests in the plurality of crypto-digests matches the previously generated crypto-digest, performing a deduplication operation on the one of the blocks in the digest calculation group of blocks that corresponds to the matching crypto-digest, wherein the deduplication operation i) causes the lower deck file system to store an additional indication of the block of data that was previously flushed from the cache to the lower deck file system and ii) discards the one of the blocks in the digest calculation group of blocks that corresponds to the matching crypto-digest.

2. The method of claim 1, further comprising
   accumulating data that is indicated by the host I/O requests that are received by the storage processor from at least one host computer into a cache that is located in the storage processor;
   detecting a cache flush event indicating that a plurality of blocks of data accumulated in the cache are to be flushed from the cache to at least one lower deck file system that is internal to the data storage system; and
   in response to detecting the cache flush event, forming an aggregation set of blocks of data within the accumulated data in the cache; and
   in response to formation of the aggregation set of blocks, selecting the digest calculation group of blocks from within the aggregation set.

3. The method of claim 2, wherein causing the hardware vector processing logic within the storage processor to simultaneously calculate the plurality of crypto-digests further comprises:
   allocating, in a function call stack located within the storage processor, a plurality of context objects, each one of the context objects corresponding to one of the blocks in the digest calculation group of blocks selected from within the aggregation set, wherein each one of the context objects contains workspace memory for use by a component of a shareable library located in the storage processor while using hardware vector processing logic within the storage processor to calculate a crypto-digest from the corresponding one of the blocks of data in the digest calculation group of blocks selected from the aggregation set; and
   passing the plurality of context objects to the component of the shareable library to cause the component of the shareable library to use the hardware vector processing logic within the storage processor to simultaneously calculate the plurality of crypto-digests.

4. The method of claim 3, wherein using the hardware vector processing logic within the storage processor to simultaneously calculate the plurality of crypto-digests further comprises:
   passing an indication of the corresponding one of the blocks in the digest calculation group of blocks to the component of the shareable library with each one of context objects in the plurality of context objects;
   in response to detecting that all crypto-digests in the plurality of crypto-digests simultaneously calculated by the hardware vector processing logic have been completely calculated, extracting the crypto-digests simultaneously calculated by the hardware vector processing logic from the plurality of context objects; and
   in response to all of the crypto-digests having been extracted from the plurality of context objects, deallocating the plurality of context objects from the function call stack.

5. The method of claim 4, wherein causing the hardware vector processing logic within the storage processor to simultaneously calculate the plurality of crypto-digests further comprises:
   allocating, in the function call stack within the storage processor, a context manager object, wherein the context manager object corresponds to the digest calculation group of blocks selected from within the aggregation set, wherein the context manager object contains workspace memory for use by the component of the shareable library while using the hardware vector processing logic within the storage processor to calculate the plurality of crypto-digests from the digest calculation group of blocks selected from the aggregation set.

6. The method of claim 5, wherein using the hardware vector processing logic within the storage processor to simultaneously calculate the plurality of crypto-digests further comprises:
   passing an indication of the context manager object to the component of the shareable library with each one of the context objects in the plurality of context objects; and
   in response to all of the crypto-digests having been extracted from the plurality of context objects, deallocating the context manager object from the function call stack.

7. The method of claim 6, further comprising:
   wherein the storage processor includes at least one processing unit;
   wherein the hardware vector processing logic within the storage processor is part of the processing unit;
   wherein the vector processing logic includes at least one vector register; and
   wherein using the hardware vector processing logic within the storage processor to simultaneously calculate the plurality of crypto-digests further comprises the component of the shareable library iteratively storing portions of each block in the digest calculation group into corresponding vector elements in the vector register to cause the vector processing logic to perform vector operations that simultaneously process the stored portions of each block.

8. The method of claim 7, wherein using the hardware vector processing logic within the storage processor to simultaneously calculate the plurality of crypto-digests comprises using the hardware vector processing logic within the storage processor to perform a secure hash function on each one of the blocks in the digest calculation group; and wherein the plurality of crypto-digests comprise digests that are outputs resulting from using the hardware vector processing logic within the storage processor to perform the secure hash function on the blocks in the digest calculation group.

9. The method of claim 8, wherein the lower deck file system maps files to blocks in an address space of the lower deck file system, wherein each file implements a corresponding data object that is accessible to the at least one host computer, and wherein blocks in the address space of the lower deck file system also correspond to non-volatile storage provisioned from a set of storage devices in the data storage system that provide storage for the lower deck file system.

10. A storage processor in a data storage system, the storage processor including a set of processing units and memory, coupled to the set of processing units, the memory storing instructions for providing data deduplication, wherein the instructions, when executed by the set of processing units, cause the set of processing units to:
cause hardware vector processing logic within the storage processor to simultaneously calculate a plurality of crypto-digests, each crypto-digest in the plurality of crypto-digests being calculated from a corresponding one of the blocks in a digest calculation group of blocks of data indicated by host I/O requests received by the storage processor from at least one host computer;
compare each one of the plurality of crypto-digests to at least one previously generated crypto-digest that was previously generated from a block of data that was previously flushed from the cache to the lower deck file system; and
in response to detecting that one of the crypto-digests in the plurality of crypto-digests matches the previously generated crypto-digest, perform a deduplication operation on the one of the blocks in the digest calculation group of blocks that corresponds to the matching crypto-digest, wherein the deduplication operation i) causes the lower deck file system to store an additional indication of the block of data that was previously flushed from the cache to the lower deck file system and ii) discards the one of the blocks in the digest calculation group of blocks that corresponds to the matching crypto-digest.

11. The storage processor of claim 10, wherein the instructions, when executed by the set of processing units further cause the set of processing units to:
accumulate data that is indicated by the host I/O requests that are received by the storage processor from at least one host computer into a cache that is located in the storage processor;
detect a cache flush event indicating that a plurality of blocks of data accumulated in the cache are to be flushed from the cache to at least one lower deck file system that is internal to the data storage system; and
in response to detecting the cache flush event, form an aggregation set of blocks of data within the accumulated data in the cache; and
in response to formation of the aggregation set of blocks, select the digest calculation group of blocks from within the aggregation set.

12. The storage processor of claim 11, wherein the instructions, when executed by the set of processing units to cause the hardware vector processing logic within the storage processor to simultaneously calculate the plurality of crypto-digests further cause the set of processing units to:
allocate, in a function call stack located within the storage processor, a plurality of context objects, each one of the context objects corresponding to one of the blocks in the digest calculation group of blocks selected from within the aggregation set, wherein each one of the context objects contains workspace memory for use by a component of a shareable library located in the storage processor while using hardware vector processing logic within the storage processor to calculate a crypto-digest from the corresponding one of the blocks of data in the digest calculation group of blocks selected from the aggregation set; and
pass the plurality of context objects to the component of the shareable library to cause the component of the shareable library to use the hardware vector processing logic within the storage processor to simultaneously calculate the plurality of crypto-digests.

13. The storage processor of claim 12, wherein the instructions, when executed by the set of processing units to cause the hardware vector processing logic within the storage processor to simultaneously calculate the plurality of crypto-digests further cause the set of processing units to:
pass an indication of the corresponding one of the blocks in the digest calculation group of blocks to the component of the shareable library with each one of context objects in the plurality of context objects;
in response to detecting that all crypto-digests in the plurality of crypto-digests simultaneously calculated by the hardware vector processing logic have been completely calculated, extract the crypto-digests simultaneously calculated by the hardware vector processing logic from the plurality of context objects; and
in response to all of the crypto-digests having been extracted from the plurality of context objects, deallocate the plurality of context objects from the function call stack.

14. The storage processor of claim 13, wherein the instructions, when executed by the set of processing units to cause the hardware vector processing logic within the storage processor to simultaneously calculate the plurality of crypto-digests further cause the set of processing units to:
allocate, in the function call stack within the storage processor, a context manager object, wherein the context manager object corresponds to the digest calculation group of blocks selected from within the aggregation set, wherein the context manager object contains workspace memory for use by the component of the shareable library while using the hardware vector processing logic within the storage processor to calculate the plurality of crypto-digests from the digest calculation group of blocks selected from the aggregation set.

15. The storage processor of claim 14, wherein the instructions, when executed by the set of processing units to cause the hardware vector processing logic within the storage processor to simultaneously calculate the plurality of crypto-digests further cause the set of processing units to:
pass an indication of the context manager object to the component of the shareable library with each one of the context objects in the plurality of context objects; and
in response to all of the crypto-digests having been extracted from the plurality of context objects, deallocate the context manager object from the function call stack.

16. The storage processor of claim 15, wherein the hardware vector processing logic within the storage processor is part of at least one of the set of processing units in the storage processor;

wherein the vector processing logic includes at least one vector register; and wherein the component of the shareable library uses the hardware vector processing logic within the storage processor to simultaneously calculate the plurality of crypto-digests further at least in part by iteratively storing portions of each block in the digest calculation group into corresponding vector elements of the vector register to cause the vector processing logic to perform vector operations that simultaneously process the stored portions of each block.

17. The storage processor of claim 16, wherein the component of the shareable library uses the hardware vector processing logic within the storage processor to simultaneously calculate the plurality of crypto-digests comprises by using the hardware vector processing logic within the storage processor to perform a secure hash function on each one of the blocks in the digest calculation group; and wherein the plurality of crypto-digests comprise digests that are outputs resulting from using the hardware vector processing logic within the storage processor to perform the secure hash function on the blocks in the digest calculation group.

18. The storage processor of claim 17, wherein the lower deck file system maps files to blocks in an address space of the lower deck file system, wherein each file implements a corresponding data object that is accessible to the at least one host computer, and wherein blocks in the address space of the lower deck file system also correspond to non-volatile storage provisioned from a set of storage devices in the data storage system that provide storage for the lower deck file system.

19. A non-transitory, computer-readable medium including instructions which, when executed by a set of processing units of in a storage processor in a data storage system, cause the set of processing units to perform a method of providing data deduplication, the method comprising the steps of:

causing hardware vector processing logic within the storage processor to simultaneously calculate a plurality of crypto-digests, each crypto-digest in the plurality of crypto-digests being calculated from a corresponding one of the blocks in a digest calculation group of blocks of data indicated by host I/O requests received by the storage processor from at least one host computer;

comparing each one of the plurality of crypto-digests to at least one previously generated crypto-digest that was previously generated from a block of data that was previously flushed from the cache to the lower deck file system; and in response to detecting that one of the crypto-digests in the plurality of crypto-digests matches the previously generated crypto-digest, performing a deduplication operation on the one of the blocks in the digest calculation group of blocks that corresponds to the matching crypto-digest, wherein the deduplication operation i) causes the lower deck file system to store an additional indication of the block of data that was previously flushed from the cache to the lower deck file system and ii) discards the one of the blocks in the digest calculation group of blocks that corresponds to the matching crypto-digest.

* * * * *